US012755240B2

(12) United States Patent
Mula et al.

(10) Patent No.: US 12,755,240 B2
(45) Date of Patent: Oct. 6, 2026

(54) BARMASTER ITEM INVENTORY SYSTEM

(71) Applicants: Paul Salvatore Mula, San Jose, CA (US); Scott C Harris, Rancho Santa Fe, CA (US)

(72) Inventors: Paul Salvatore Mula, San Jose, CA (US); Scott C Harris, Rancho Santa Fe, CA (US)

( * ) Notice: Subject to any disclaimer, the term of this patent is extended or adjusted under 35 U.S.C. 154(b) by 54 days.

(21) Appl. No.: 19/044,960

(22) Filed: Feb. 4, 2025

(65) Prior Publication Data

US 2025/0245624 A1 Jul. 31, 2025

Related U.S. Application Data

(63) Continuation of application No. 18/451,403, filed on Aug. 17, 2023, now Pat. No. 12,481,957.

(51) Int. Cl.

| | |
|---|---|
| ***G06Q 10/087*** | (2023.01) |
| ***G06K 7/10*** | (2006.01) |
| ***G06K 7/14*** | (2006.01) |
| ***G06Q 50/12*** | (2012.01) |

(52) U.S. Cl.
CPC ....... *G06Q 10/087* (2013.01); *G06K 7/10366* (2013.01); *G06K 7/1413* (2013.01); *G06Q 50/12* (2013.01)

(58) Field of Classification Search
CPC .. G06Q 10/087; G06Q 50/12; G06K 7/10366; G06K 7/1413
See application file for complete search history.

(56) References Cited

U.S. PATENT DOCUMENTS 11,750,953 B2 * 9/2023 Hershberger ............ H04Q 9/00 177/245

FOREIGN PATENT DOCUMENTS

CA 2664667 A1 * 4/2008 ........... G07G 1/0072

* cited by examiner

*Primary Examiner* — Ariel J Yu
*Assistant Examiner* — Denisse Y Ortiz Roman
(74) *Attorney, Agent, or Firm* — Scott C Harris, Esq

(57) ABSTRACT

An inventory management system for maintaining inventory of liquid containers. A first container storage device, in a stock room weighs bottles and gets unique IDs on the bottles. A second device also weighs and reads information in a bar area. A database stores identification information and weights from the first and second container storage device, and operating to determine when a first container has been lifted from said first container storage device and moved to said second container storage device. The database indicates the first container as being in storage when the first container is on said first container storage device and indicates the first container as being in use when the first container when the first container is on said second container storage device. When the weights differ, the computer indicates an incident.

16 Claims, 3 Drawing Sheets

BARMASTER ITEM INVENTORY SYSTEM

BACKGROUND

Many different systems for monitoring inventory exist. These systems typically monitor the items that are brought into inventory; and monitor the items that are brought out of inventory to be sold. The difference between products that come in to inventory, and what gets sold, are generically referred to as shrinkage. Shrinkage comes from legitimate causes such as spoilage, breakage, and the like, as well as from various kinds of pilfering including employee pilfering, and other kinds of thievery.

Businesses desire to keep track of how much product comes in and how much product gets sold and the differences between them. The businesses also want to know what happens to the differences.

In our previous patent applications, including US 2009 026-1974, we describe a system that wirelessly monitors the dispensing of items.

SUMMARY OF THE INVENTION

The inventors recognized that there are a number of drawbacks with the current systems and recognized ways to improve the inventory monitoring process even beyond those described in our previous patent applications.

Embodiments describe an inventory registration process, following the flow of the products through the various stages, and monitoring the products at various levels along in order to obtain maximum visibility into the product chain and to view differences between the products coming in and the products being sold.

BRIEF DESCRIPTION OF THE DRAWINGS

In the Drawings.

the figures show aspects of the invention, and specifically.

DETAILED DESCRIPTION

The present application describes a system for monitoring products in an sales establishment, using a computer that tracks the products from their initial entry into the establishment.

In embodiments, the establishment can be a restaurant or bar. However, other embodiments, can monitor different products in different environments.

Figure 1:
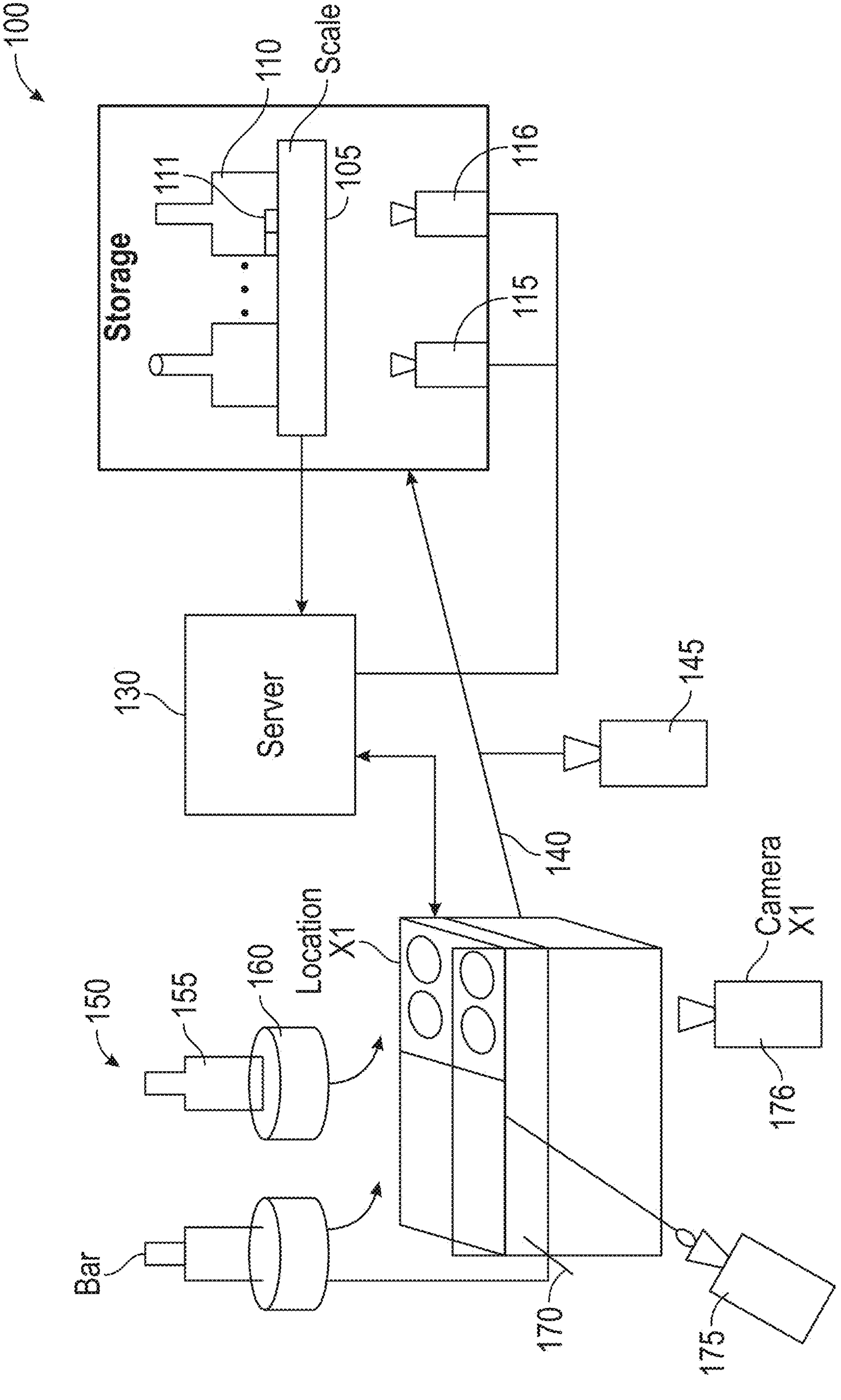
FIG. 1 shows a block diagram of hardware.

An embodiment of the overall hardware used according to the present system is shown in FIG. 1.

The block diagram of FIG. 1 shows, for simplicity, only two locations, a storage location 100 such as a storeroom or closet, and a bar location 150, from which the drinks are dispensed. In this embodiment, liquor or other dispensable materials of this type are initially brought into the storage room, initiated from deliveries as described herein, and unloaded into locations in the storage room 100 as described herein. Each item to be dispensed is referred to herein as a container, or consumable container such as 110. The consumable containers are bottles in an embodiment; however it should be understood that the items can be any items to be dispensed including liquor, wine, beer, or any other such consumable in any kind of container. The containers contain liquid that is poured out of a bottle to serve to a user to pour a drink. When liquid is poured from the bottle to serve a drink, the reduced amount of liquid in the bottle causes a weight reduction. Each bottle such as 110 is stored on a scale and reader 105, which reads information from the bottle, e.g., the liquor bottle 110 including its unique ID 111, and its weight obtained from the scale.

All locations where the bottles are located is also monitored by cameras, with the storage room monitored by cameras 115, 116, and each location in the storage room is associated with at least one camera. In an embodiment, there are sufficient cameras to image and video every area which can store, or transport, liquor bottles. In the storage room, for example, all areas of the storage room are covered by cameras such as 115 116. The information from the cameras and the scale and reader is stored by a computer based server 130 which operates as described herein.

Liquor bottle such as 110 can also be removed from the storage room, and moved to the bar area, along the path 140. The path 140 also includes cameras 145 along that path to obtain videos and images of the liquor bottles along the path. The bar 150 also includes consumable containers, e.g., liquor bottles, shown as 155, and also has scales and readers 160. Each liquor bottle may have its own scale and reader, or there can be a scale and reader such as 170 for multiple bottles.

Each area which houses any of the bottles is imaged by the camera 175, 176, each camera being associated with a specific area along the bar.

The flowcharts shown in the figures can be carried out on one or more of the computers, and can be carried out on a cloud computing based system, or a distributed flowchart carried out using multiple different systems, for example individual users with phones or terminals such as point of sale or comparable terminals having their apps carry out parts of the system operation which then communicate with a central database. Different parts of this invention can be used individually.

Figure 2:
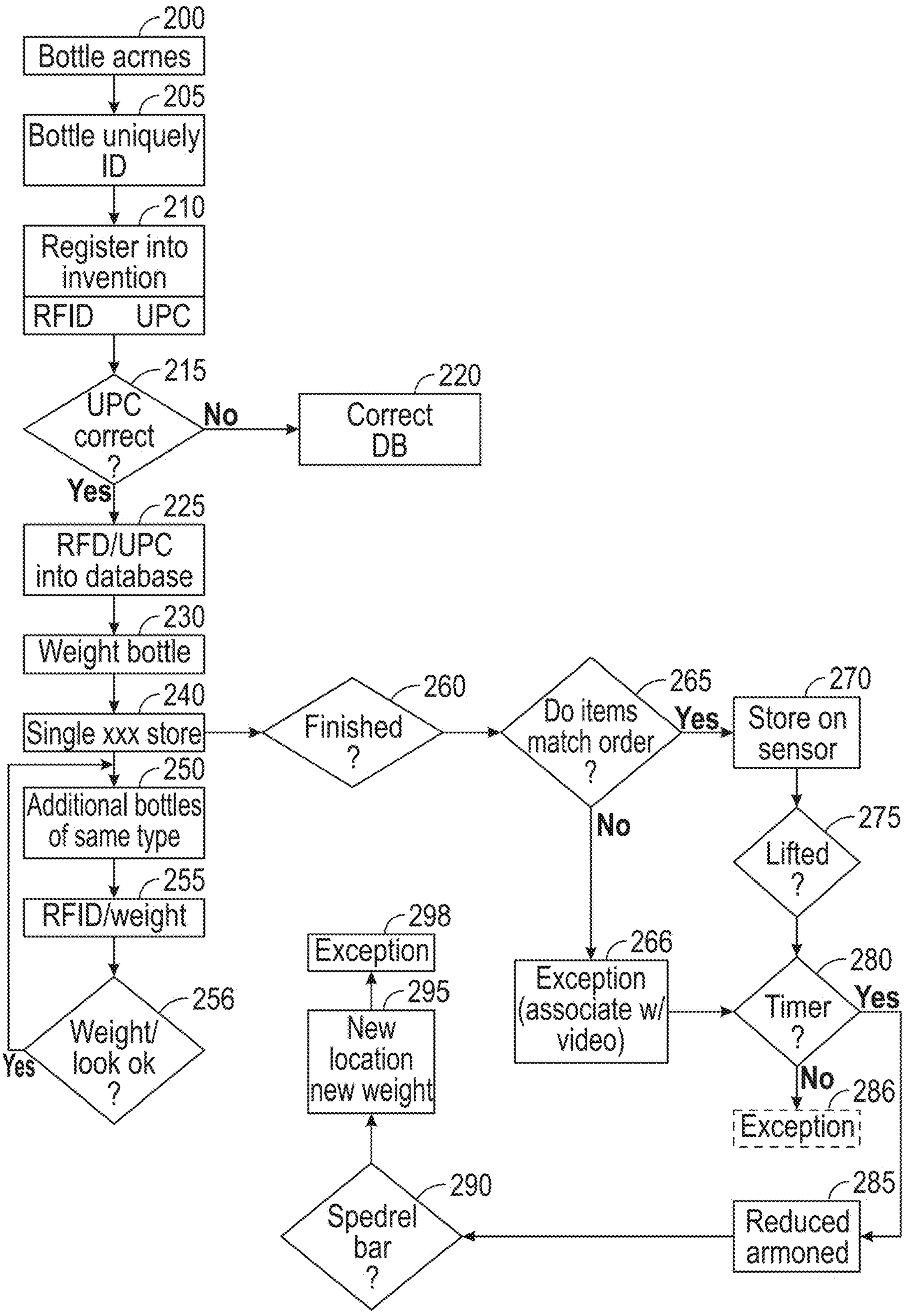
FIG. 2 shows a flowchart of operation.

In an embodiment, the process starts when inventory arrives at the restaurant, as shown in 200 in him FIG. 2. The bottle typically arrives as part of a shipment of multiple bottles. As an initial step, the bottle is uniquely identified at 205. In an embodiment, this can affix an RFID tag sticker to the bottle. In an embodiment, there can be multiple different RFID tags, each with a unique address. These can be located in the stockroom in a sheet or roll of stickers that are manually or automatically affixed to the bottle when the bottle arrives in the stockroom.

In other embodiments, this can use for example a QR code, which defines a unique ID, or can use some other form of identification.

In an embodiment, the ID can be etched on to the bottle using a laser.

A printer can print a label to be attached to the bottle.

At 210, the bottle is registered into inventory by using an inventory registration module to read the unique ID (for example the RFID) and also to determine the specific contents of the bottle. An embodiment can read the universal product code or UPC of the bottle to find its contents.

In another embodiment, the contents of the bottle can be determined from the camera obtaining information about the bottle contents and using an artificial intelligence algorithm to automatically determine the bottle contents by reading the printing on the bottle showing the brand of the bottle, alcohol type of the bottle, and its size.

When a UPC is used, The UPC brings up the bottle information about the specific contents of the bottle.

At 215, the user is given the option to modify the contents of what the system has automatically found about the bottle by modifying the database at 220.

Once the data has been read, the system registers the RFID and UPC or some other identifier of the bottles contents, as data into the database at 225.

At 230, the user is prompted to place the bottle on the scale and weigh the bottle to get a baseline weight for the bottle.

All of this information is then stored at 240. This stores information of RFID, the contents of the bottle, and its initial weight, and its RFID. This is associated with stored bottles, in the store room.

At 250, the system asks the user if there are additional bottles of the same type. For example, this may be very common, when bars receive a whole case of a certain kind of beverage, such as a case of wine or a case of spirits. If there are additional bottles of the same type, then the user is prompted to enter the RFID and weight of each of these additional bottles at 255. 256 checks each of these additional entries, to determine if the weight is within a specified acceptable weight range for the bottle, and using the camera to determine if the look of the bottle matches the name or type of the bottle which has just been entered. If so, then the process continues, entering bottles, until the system is told that there are no additional bottles to enter into inventory. Each of these bottles is added to the database, as described herein, along with its initial weight.

Figure 3:
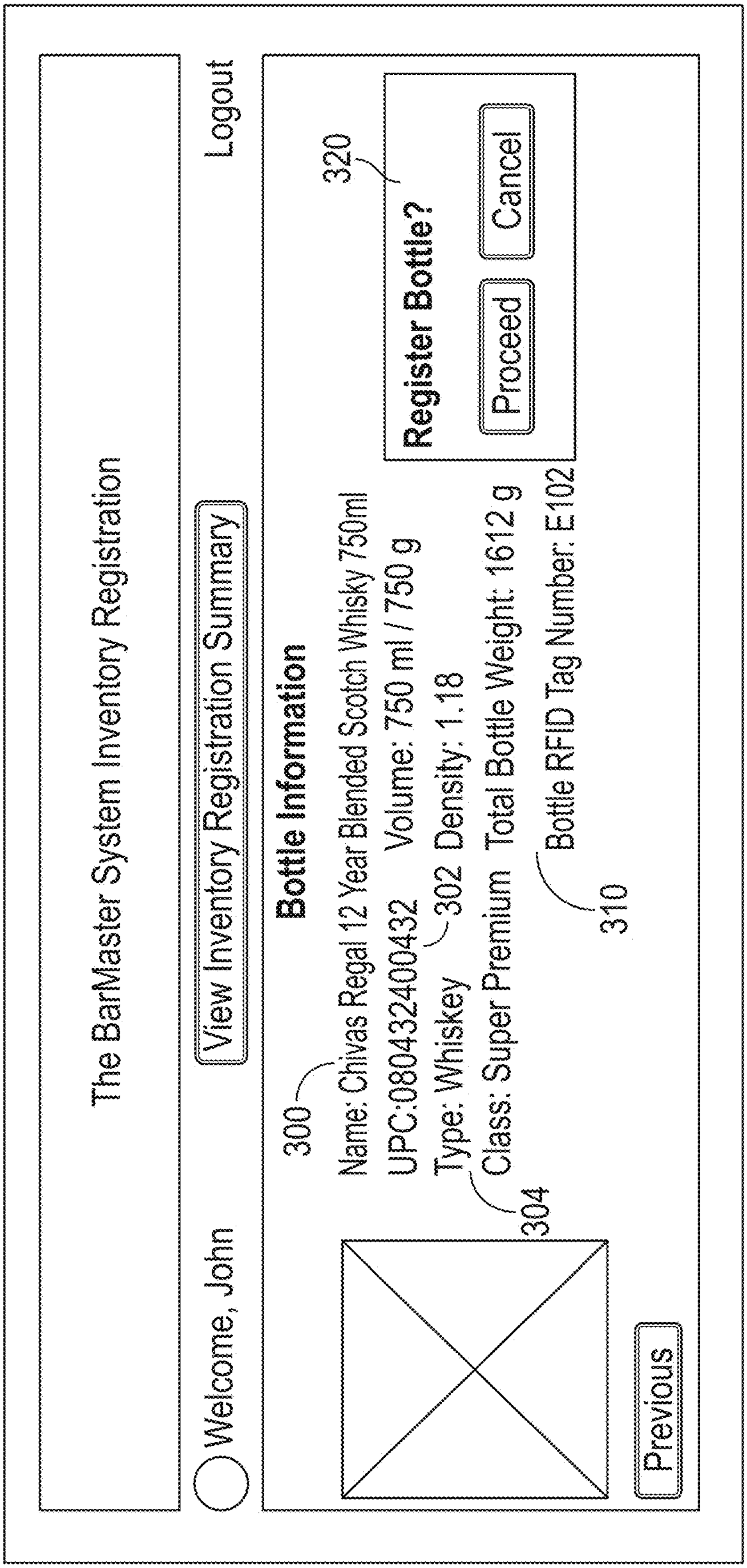
FIG. 3 shows an inventory registration screen.

In this way, when using a bulk entry, the UPC needs to be entered only once, and additional bottles are just identified by RFID and weight. In addition, when the bulk entry is used, at least one aspect of the bottles contents are verified (at 256) to avoid employees simply entering everything as being the same bottle or making errors. By verifying at least one aspect, this tends to ensure that the bottles are properly inventoried. The weight can be correlated with the weight of the first bottle at 230, and can be accepted so long as the subsequent weights are within a threshold of the initial weight, e.g., within 2 ozs of the same wight FIG. 3 shows an exemplary screen for the inventory registration. This shows for any given bottle, its name 300, UPC, 302, information about the product including what it is and its level, and the weight and RFID 310 received from the scale/reader. The system also pops up a message 320 to confirm whether the user should register the bottle, Once registered, the bottle is added to the inventory registration system as inventory into the stockroom.

When the bulk operation of entering bottles into inventory is completed at step 260, 265 determines if all the items which have been received and entered into the database match to the ordered items. For each item, the quantity received is compared with the quantity ordered for the item, as set in a database. If the items received do not match the items that were ordered, an exception is declared at 266.

In this embodiment, any time an exception or incident is declared, video contents from the cameras in the area of the exception are associated with the exception. At 266 when the exception is declared, all of the video from every camera that was facing the inventory receiving is saved for the time of the inventory unpacking, and associated with this exception. This allows a supervisor or other person reviewing the exception later to receive the video as part of the exception, to determine so that the user can watch for example bottles being boxes being opened, bottles being removed, and all other actions that have occurred.

If the exception is due to a short shipment, these video can provide evidence that the proper items were not received. This can also show for example employee pilfering. If bottles were received broken, the video can show that the bottles were received broken.

The exception can require a user to enter a reason, such as the wrong item was received, bottles were broken, or other reason. The exception sends a notification to the "manager", specifically the quantity of unregistered bottles, purchase order number, the receiving daytime person, as well as a video of the receiving operation.

Otherwise, as described above, the system associates the RFID, UPC, and starting weight, to define a unique bottle ID.

The stockroom stores each bottle on a sensor at 270. In an embodiment, the sensor can be a RFID sensor and scale that automatically determines the weight of the bottle, and reads the RFID reader of the bottle.

When a bottle is removed from the storeroom, the scale will detect the weight change at 275, establishing a lift event. This causes the beginning of a routine that is executed any time a bottle is lifted.

In an embodiment, the lift event starts a timer at 280. The timer can be, for example, a five minute timer or other user settable amount, after which the bottle must be placed back on the sensor (if bottles are being rearranged, for example) or somewhere else, if bottles are being moved.

The timer at 280 allows the bottle to be replaced or removed at 285. For example, the bottle can be replaced back on the same sensor, or a different sensor in the storeroom, or can be moved to a sensor e.g, 160, at the bar at 290. The sensor 190 at 290 obtains a new weight, and associates a new location for the bottle with the new sensor.

Each time this happens, so long as the new weight is within a certain amount of the original weight, there are no problems established by the movement. However, if 296 determines too much of a difference, then an exception is declared at 297, and all of the videos of the bottle, showing the bottle being removed, moved all the way from the storeroom to the bar, is associated with the exception.

If the bottle is not replaced within the time of the setting of the timer at 280, this also causes an exception, which associates the information with an exception, specifically, all of the information about the exception, and the video obtained from the locations where the exception occurred.

Assuming that the bottle has been properly moved to the bar sensor, however, its location is updated in the database along with its new weight at 295.

The computer thus indicates the first container as being in storage when the first container is on said first container storage device and indicates the first container as being in use when the first container when the first container is on said second container storage device.

Once a bottle has been moved from the store room to the bar area, the bottle is ready to dispense drinks.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for maintaining inventory of liquid containers, comprising:

a first container storage device, physically located in an first inventory storage location, the first container storage device including a first weight measuring part which measures weights of multiple different containers and which includes an identification reader which reads unique identifiers from each of the multiple different containers;

a second container storage device, physically located in a second, serving location different than the first location, the second container storage device including a second weight measuring part which measures weights of multiple different containers in the second location and which includes a second identification reader which reads unique identifiers from each of the multiple different containers in the second location;

a computer having a database that stores information, that computer being in communication with said first weight measuring part and said second weight measuring part, said computer receiving identification information and weights from the first and second container weight measuring part and stores a first indication that containers from which identification information and weights were received from the first weight measuring part indicating that the containers from which identification information and weights were received from the first weight measuring part are stored in the first inventory storage location, and stores a second indication that containers from which identification information and weights were received from the second weight measuring part indicating that the containers from which identification information and weights were received from the second weight measuring part are stored in the second serving location;

the computer operating to determine when a first container has been lifted from one of said container storage devices, by detecting a reduction in weight on the one container storage device;

and starting a timer when a first container has been lifted from the one of said container storage devices, the computer establishing an incident when the first container is not replaced on a container storage device within a setting time of the timer;

if the container is removed from the first container storage device and replaced on the second container storage device, then storing a first weight of the first container when the first container is removed from said first container storage device and storing a second weight of the first container when the first container is placed on said second container storage device;

if the container is removed from the second container storage device and replaced on the first container storage device, then storing a first weight of the container when the second container is removed from said first container storage device and storing a second weight of the first container when the first container is placed on said first container storage device;

the computer establishing an incident when the weight of the first container on said first container storage device differs from the weight of the first container on said first container storage device by a threshold amount, and not establishing the incident when the weight of the first container on said first container storage device does not differ from the weight of the first container on said second container storage device by the threshold amount, where the computer indicates the first container in the database as being in storage when the first container is on said first container storage device, and indicates the first container in the database as being in use when the when the first container is on said second storage device.

2. The system as in claim 1, further comprising a plurality of surveillance cameras, and wherein when the computer declares the incident, the computer obtains video from the cameras and automatically associates information from the cameras in an area of said first container storage device and in the area of said second container storage device with said incident to create a report.

3. The system as in claim 1, wherein the unique identifiers are RFID tags.

4. The system as in claim 1, wherein the computer controls entering new containers into inventory by determining a content of each container, and determining an initial weight of said each container using the first container storage device, and entering the content and the initial weight along with the unique identifier into the database as associated with the first container storage device.

5. The system as in claim 4, wherein the computer compares the containers that are entered into inventory against the inventory that was ordered, and declares an incident when the containers entered into inventory does not match to the containers that were ordered.

6. The system as in claim 4, wherein the computer enables determining the content of the container using a camera to image the container and to automatically recognize writing on the container, to determine the contents of the container from the image and uses the content determined by imaging the container to enter the content into the database.

7. The system as in claim 4, wherein the timer is set for a specified period of time.

8. A method for maintaining inventory of liquid containers, comprising:

maintaining a database showing liquid containers that are in inventory storage and liquid containers that are in use in a serving area;

using a first container storage device, in a first inventory storage location, to measure weights of multiple different containers in the first location;

using the first container storage device to read unique identifiers from each of the multiple different containers;

using a second container storage device, in a second serving area location different than the first location, to measure weights of multiple different containers in the second location;

using the second container storage device to read unique identifiers from each of the multiple different containers;

using a computer to store information from the first and second container storage devices in the database, by receiving identification information and weights from the first and second container storage devices;

the computer operating to determine when a first container has been lifted from said first container storage device, by detecting a reduction in weight on the first container storage device, and starting a timer of a specified period when a first container has been lifted from said first container storage device, and not starting the timer when the first container has not been lifted from said first container storage device;

the computer establishing an incident when the first container is not replaced on a sensor before the timer ends, and not establishing the incident when the first container is replaced on the sensor before the timer ends, and storing a first weight of the first container when the first container is removed from said first container storage device and storing a second weight of the first container when the first container is replaced on said second container storage device;

establishing an incident when the weight of the first container on said second container storage device differs from the weight of the first container on said second container storage device by a threshold amount, and not establishing the incident when the weight of the first container on said second container storage device does not differ from the weight of the first container on said second container storage device by the threshold amount, and indicating the first container as being in storage when the first container is on said first container storage device and indicating the first container as being in use when the first container is on said second container storage device.

9. The method as in claim 8, further comprising obtaining video from a plurality of surveillance cameras, and associating the video from the cameras in the area of said first container storage device and in the area of said second container storage device with said incident to create a report.

10. The method as in claim 8, wherein the reading unique identifiers comprises reading RFID tags.

11. The method as in claim 8, further comprising entering new containers into inventory by determining a content of each container, and determining an initial weight of said each container using the first container storage device, and entering the content and the initial weight along with the unique identifier into the database as associated with the first container storage device.

12. The method as in claim 11, wherein the determining the content of the container comprises reading a UPC code on the container and using the content determined by reading the UPC code to enter the content into the database.

13. The method as in claim 11, wherein the determining the content of the container comprises using a camera to image the container and to automatically recognize writing on the container, to determine the contents of the container from the image and using the content determined by imaging the container to enter the content into the database.

14. The method as in claim 11, further comprising determines the content of a first container, entering the first container into inventory, and thereafter obtains a command that there are multiple additional containers that have a same content as the first container and the computer enters the multiple additional containers into inventory as having the same content as the first container, without individually determining contents of the multiple additional containers.

15. The method as in claim 14, further comprising an aspect of the multiple additional containers before entering the additional containers into inventory.

16. The method as in claim 11, further comprising storing, for each of the containers, a unique identifier, contents, a weight and a location.

* * * * *